United States Patent
Jung et al.

(10) Patent No.: US 9,155,041 B2
(45) Date of Patent: *Oct. 6, 2015

(54) DATA RECEPTION AND TRANSMISSION METHOD AND APPARATUS FOR POWER SAVING IN COMMUNICATION SYSTEM USING MULTIPLE CARRIERS

(71) Applicant: LG ELECTRONICS INC., Seoul (KR)

(72) Inventors: In-Uk Jung, Gyeonggi-Do (KR);
Ki-Seon Ryu, Gyeonggi-do (KR);
Eun-Jong Lee, Gyeonggi-do (KR);
Yong-Ho Kim, Gyeonggi-do (KR);
Young-Soo Yuk, Gyeonggi-do (KR)

(73) Assignee: LG ELECTRONICS INC., Seoul (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,490

(22) Filed: Oct. 9, 2014

(65) Prior Publication Data

US 2015/0055533 A1    Feb. 26, 2015

Related U.S. Application Data

(63) Continuation of application No. 13/054,478, filed as application No. PCT/KR2009/003936 on Jul. 16, 2009.

(60) Provisional application No. 61/081,713, filed on Jul. 17, 2008, provisional application No. 61/090,239, filed on Aug. 20, 2008.

(30) Foreign Application Priority Data

Jul. 15, 2009   (KR) ................. 10-2009-0064662

(51) Int. Cl.
*H04W 52/02*   (2009.01)
*H04L 25/49*   (2006.01)
*H04W 72/04*   (2009.01)

(52) U.S. Cl.
CPC ....... *H04W 52/0209* (2013.01); *H04L 25/4917* (2013.01); *H04W 52/0225* (2013.01); *H04W 72/0453* (2013.01); *Y02B 60/50* (2013.01)

(58) Field of Classification Search
CPC ..................... H04W 52/262; H04W 52/0206
USPC ............... 370/310, 328, 329, 336; 455/127.1, 455/127.5
See application file for complete search history.

(56) References Cited

U.S. PATENT DOCUMENTS 7,471,655 B2   12/2008  Gallagher et al.
8,036,702 B2   10/2011  Etemad
(Continued)

FOREIGN PATENT DOCUMENTS

JP   9-289684      11/1997
JP   2002-010329   1/2002
(Continued)

OTHER PUBLICATIONS

Shkumbin Hamiti, "The Draft IEEE 802.16m System Description Document", Jun. 16, 2008, IEEE 802.16 Broadband Wireless Access Working Group, p. 48.*
(Continued)

*Primary Examiner* — Siming Liu
(74) *Attorney, Agent, or Firm* — Lee, Hong, Degerman, Kang & Waimey

(57) ABSTRACT

The present invention relates to a multi-carrier resource utilization method and apparatus for power saving in a communication system using a multi-carrier, in which the activation of a secondary carrier for transmitting and receiving data traffic between a terminal and a base station is determined according to the QoS (Quality of Service) requirements such as a data traffic status between the terminal and the base station, a maximum sustained traffic rate, a maximum traffic burst size, or the like, and an indication message (Indication) indicating this is transferred to the terminal through a primary carrier to transmit and receive data traffic through the activated secondary carrier.

7 Claims, 4 Drawing Sheets

(56) References Cited

U.S. PATENT DOCUMENTS

| | | | |
|---|---|---|---|
| 2001/0038616 | A1 | 11/2001 | Fong et al. |
| 2005/0143027 | A1 | 6/2005 | Hiddink et al. |
| 2006/0270431 | A1 | 11/2006 | Yoshi |
| 2007/0036179 | A1 | 2/2007 | Palanki et al. |
| 2007/0253498 | A1 | 11/2007 | Matsumoto et al. |
| 2009/0163158 | A1* | 6/2009 | Chitrapu et al. ........... 455/127.5 |

FOREIGN PATENT DOCUMENTS

| | | |
|---|---|---|
| JP | 2007-088517 | 4/2007 |
| KR | 10-2003-0021521 | 3/2003 |
| KR | 10-2008-0014027 | 2/2008 |

OTHER PUBLICATIONS

Korean Intellectual Property Office Application Serial No. 10-2009-0064662, Notice of Allowance dated Apr. 29, 2013, 2 pages.

Huawei, "Disscussion [sic] on dual cell deployment secnarions [sic]", R1-081942, 3GPP TSG-RAN WG1 Meeting #53, May 2008, 3 pages.

U.S. Appl. No. 13/054,478, Office Action dated Apr. 3, 2015, 11 pages.

* cited by examiner

DATA RECEPTION AND TRANSMISSION METHOD AND APPARATUS FOR POWER SAVING IN COMMUNICATION SYSTEM USING MULTIPLE CARRIERS

CROSS-REFERENCE TO RELATED APPLICATIONS

This application is a continuation application of U.S. patent application Ser. No. 13/054,478, filed on Jan. 14, 2011, currently pending, which is the National Stage filing under 35 U.S.C. 371 of International Application No PCT/KR2009/003936, filed on Jul. 16, 2009, which claims the benefit of earlier filing date and right of priority to Korean Application No. 10-2009-0064662, filed on Jul. 15, 2009, and also claims the benefit of U.S. Provisional Application Ser. Nos. 61/090,239, filed on Aug. 20, 2008, and 61/081,713, filed on Jul. 17, 2008, the contents of which are all incorporated by reference herein in their entirety.

TECHNICAL FIELD

The present invention relates to a resource utilization apparatus and method for power saving in a multi-carrier communication system, and more particularly, to an apparatus and method for preventing the resource consumption and unnecessary power consumption of a terminal by activating or deactivating multi-carriers allocated to the terminal based on the status of data traffic.

BACKGROUND ART

With the development of the communication technology, services provided by a mobile communication system are being gradually developed into packet data transmission and reception services, multimedia broadcasting services, and the like, as well as voice communication services.

In the third generation services, such as WCDMA currently being serviced, high capacity data as well as voice can be transmitted and received at a high transmission rate, and furthermore, the standardization work is actively carried out, such as long-term evolution network (LTE), IEEE 802.16m, and the like, in order to make an evolved network having a wider bandwidth, considering a rapid increase of data traffic in the future.

In particular, IEEE 802.16m, for which its standardization work is actively carried out, has set a goal to develop a standard specification satisfying the requirement of an IMT-Advanced system while maintaining compatibility with existing 802.16-based terminals and base station equipment. In the IMT-Advanced system, above all, more than 40 MHz of broadband communication service support is required, and in IEEE 802.16m, broadband communication support is also essential to satisfy the requirement of the IMT-Advanced system. However, it is in fact difficult to define a standard for all bandwidths, and as a result, a communication system using a multi-carrier approach that supports broadband using a plurality of carriers is under discussion. In the multi-carrier system, discussed under IEEE 802.16m, it is possible to transmit and/or receive data between a terminal and a base station by accessing to each other through at least two and more frequency assignments (FAs) at the same time, and therefore, it has an advantage that high-capacity, high-speed data transmission and reception is possible compared to the existing single-carrier approaches. Also, it has a feature that communication is possible using a broader bandwidth from the standpoint of a mobile station (MS) depending on circumstances, and more users can be accommodated from the standpoint of a base station (BS).

However, in the multi-carrier system, when the terminal allocates CQI channels, respectively, for all carriers allocated by the base station, CQI channels are allocated even to the channels for which data traffic is not actually generated, thereby creating a problem of generating resource consumption. Furthermore, in the terminal, all the relevant RF modules are turned on for all carriers allocated by the base station regardless of whether or not data traffic is actually generated, thereby creating a problem of having serious power consumption.

DISCLOSURE OF THE INVENTION

As described above, an aspect of the present disclosure is to provide an apparatus and method for preventing resource consumption and unnecessary power consumption of a terminal by suitably activating or deactivating multi-carriers allocated to the terminal according to its capability such as a data traffic status, a maximum sustained traffic rate, or a maximum traffic burst size, in order to solve a problem of generating resource consumption and unnecessary power consumption of a terminal in a conventional communication system having a multi-carrier method in which CQI channels are allocated or terminal RFs are unnecessarily turned on though data traffic is not actually generated for all carriers allocated to the terminal.

In order to accomplish the foregoing object, according to a method of transmitting and receiving data using a multi-carrier in accordance with an embodiment of the present invention, in a method of allowing a base station and a terminal to transmit and receive data using at least one or more carriers in a communication system using a multi-carrier including a primary carrier for transmitting and receiving PHY/MAC control information and data for communicating between the base station and the terminal, the method may include determining the activation of a secondary carrier for transmitting and receiving data traffic between the base station and the terminal; transferring an indication message (Indication) indicating the activation of the secondary carrier to the terminal through the primary carrier; and transmitting the data traffic to the terminal through the activated secondary carrier.

Preferably, the method of transmitting and receiving data using a multi-carrier, in said transferring a secondary carrier activation indication message, may further include transferring an activation indication message of the secondary carrier to the terminal, and then receiving an activation confirmation message of the secondary carrier from the terminal.

Preferably, the method of transmitting and receiving data using a multi-carrier may further include transferring an indication message indicating the deactivation of the secondary carrier to the terminal through the primary carrier or secondary carrier, and receiving a deactivation confirmation message of the secondary carrier from the terminal.

Preferably, it is characterized in that the indication message includes carrier index information indicating an index of the secondary carrier; and operation information indicating the activation or deactivation operation of the secondary carrier indicated by the carrier index, and preferably, it is characterized by further including offset information indicating a timing for implementing the activation or deactivation operation.

Preferably, it is characterized in that the indication message has any one form of an extended subheader, a signaling header, a piggy back message, a map information message, and a MAC (medium access control) management message.

Preferably, according to the method of transmitting and receiving data using a multi-carrier, in said determining the activation of the secondary carrier, it is characterized in that the activation of the secondary carrier is determined according to a data traffic status between the terminal and base station, a maximum sustained traffic rate, or a maximum traffic burst size.

In order to accomplish the foregoing object, according to a method of transmitting and receiving data using a multi-carrier in accordance with an embodiment of the present invention, in a method of transmitting and receiving data using a multi-carrier including a primary carrier for transmitting and receiving PHY/MAC control information and data for communicating with a base station and at least one or more secondary carriers using the primary carrier and other RFs (radio frequencies) in a terminal supporting the multi-carrier, the method may include receiving an indication message (Indication) indicating the activation of the secondary carrier from the base station through the primary carrier; turning on the RF of the secondary carrier and activating the secondary carrier; and receiving data from the base station through the activated secondary carrier.

Preferably, the method of transmitting and receiving data using a multi-carrier according to an embodiment of the present invention may further include transferring an activation confirmation message of the secondary carrier to the base station through the primary carrier.

Preferably, the method of transmitting and receiving data using a multi-carrier according to an embodiment of the present invention may further include receiving an indication message indicating the deactivation of the secondary carrier from the base station through the primary carrier or secondary carrier; and turning off the RF of the secondary carrier and deactivating the secondary carrier according to the indication message received from the base station.

Preferably, the method of transmitting and receiving data using a multi-carrier according to an embodiment of the present invention may further include transferring a deactivation confirmation message of the secondary carrier to the base station through the primary carrier.

Preferably, the indication message may include carrier index information indicating an index of the secondary carrier to be activated by the terminal; and operation information indicating the activation or deactivation operation of the secondary carrier indicated by the carrier index.

Preferably, the indication message may further include offset information indicating a timing for implementing the operation.

Preferably, it is characterized in that the indication message may have any one form of an extended subheader, a signaling header, a piggy back message, a map information message, and a MAC (medium access control) management message.

Preferably, the method of transmitting and receiving data using a multi-carrier according to an embodiment of the present invention is characterized in that the activation of the secondary carrier may be determined according to a data traffic status, a maximum sustained traffic rate, or a maximum traffic burst size.

In order to accomplish the foregoing object, according to an apparatus of transmitting and receiving data using a multi-carrier in accordance with an embodiment of the present invention, in an apparatus of transmitting and receiving data using a multi-carrier including a primary carrier for transmitting and receiving various control information and data for communicating with a base station and at least one or more secondary carriers using the primary carrier and other RFs (radio frequencies), the apparatus may include a first receiving unit configured to transmit and/or receive data to and/or from the base station through the primary carrier; a second receiving unit configured to transmit and/or receive data to and/or from the base station through the secondary carrier; and a controller configured to control the power of the first receiving unit and the second receiving unit, wherein the controller receives an indication message (Indication) indicating the activation or deactivation of the secondary carrier from the base station through the first receiving unit and controls the power of the second receiving unit to perform the activation or deactivation of the secondary carrier according to the indication message received from the base station.

Preferably, in the apparatus of transmitting and receiving data using a multi-carrier, the indication message may include carrier index information indicating an index of the secondary carrier; and operation information indicating the activation or deactivation operation of the secondary carrier indicated by the carrier index.

Preferably, the indication message may further include offset information indicating a timing for implementing the operation.

Preferably, in the apparatus of transmitting and receiving data using a multi-carrier, it is characterized in that the indication message may have any one form of an extended subheader, a signaling header, a piggy back message, a map information message, and a MAC (medium access control) management message.

Preferably, in the apparatus of transmitting and receiving data using a multi-carrier, it is characterized in that the activation or deactivation of the secondary carrier may be determined according to a data traffic status, a maximum sustained traffic rate, or a maximum traffic burst size.

Preferably, in the apparatus of transmitting and receiving data using a multi-carrier, it is characterized in that the controller may receive an indication message indicating the activation or deactivation of the secondary carrier to perform the activation or deactivation of the secondary carrier and transmit a confirmation message to this to the base station through the primary carrier.

An aspect of the present disclosure is to provide an apparatus and method for preventing resource consumption and unnecessary power consumption of a terminal by suitably activating or deactivating multi-carriers allocated to the terminal according to its capability such as a data traffic status, a maximum sustained traffic rate, or a maximum traffic burst size, in order to solve a problem of generating resource consumption and unnecessary power consumption of a terminal in a conventional communication system having a multi-carrier method in which CQI channels are allocated or terminal RFs are unnecessarily turned on though data traffic is not actually generated for all carriers allocated to the terminal.

MODES FOR CARRYING OUT THE PREFERRED EMBODIMENTS

Figure 1:
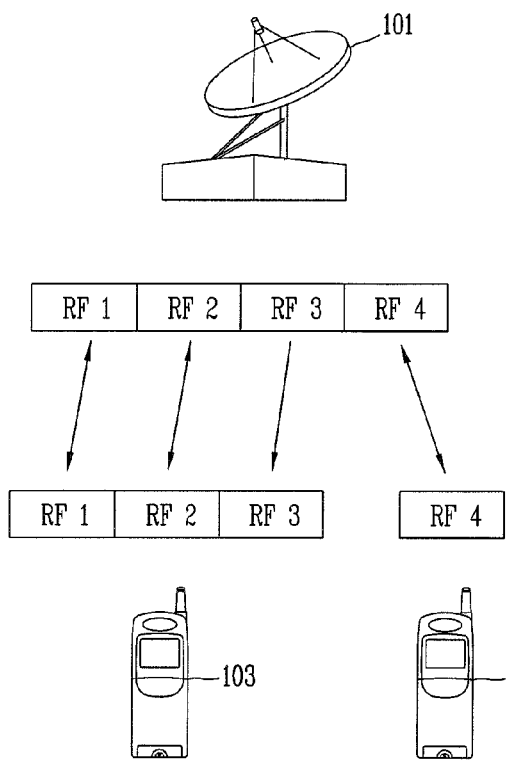
FIG. 1 is a view illustrating a multi-carrier system according to an embodiment of the present invention.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Hereinafter, the term "terminal" is used, but the terminal may be also referred to as a subscriber station (SS), user equipment (UE), mobile equipment (ME), and a mobile station (MS). Furthermore, the terminal may be portable equipment having a communication function such as portable phone, PDA, smart phone, notebook, etc., or non-potable equipment such as PC, vehicle mounted device, etc.

I. Multi-Carrier Terminology

FIG. 1 is a view schematically illustrating a multi-carrier system according to an embodiment of the present invention.

As illustrated in FIG. 1, in a multi-carrier mode according to the present invention, the number of carriers allocated to terminals 103, 105 by a base station 101 to be used for data transmission and reception, or the like, may be at least two or more. According to an embodiment, for the sake of convenience of explanation, it will be described below a case where four carriers RF1, RF2, RF3 and RF4 are used. The base station 101 may allocate multiple carriers RF1, RF2, and RF3 for a terminal 103 to be used in a multi-carrier mode, and a carrier RF4 may be also allocated to another terminal 105 from the base station 101. In this case, the terminal 103 operates in a multi-mode by using one or more carriers, and the terminal 105 operates in a single-mode by using only one carrier.

In the base station 101, multi-carrier types can be divided into two kinds of groups, a fully configured carrier (hereinafter, "FCC"), and a partially configured carrier (hereinafter, "PCC"). The FCC is defined as a carrier capable of transmitting and receiving uplink/downlink data and PHY/MAC control information, and the PCC as a carrier capable of transmitting only downlink data to a terminal. Accordingly, the PCC may be applicable to a carrier mainly used in a Multimedia Broadcast Multicast Service (MBMS), and the like.

Referring to FIG. 1, RF1 and RF2, among the carriers allocated to the terminal 103, correspond to the FCC capable of transmitting and receiving uplink/downlink data and capable of transmitting and receiving PHY/MAC control information of the terminal. RF3, allocated to the terminal 103, corresponds to the PCC capable of transmitting downlink data only from a base station to a terminal. The carrier RF4, allocated to the terminal 105, corresponds to the FCC capable of transmitting and receiving uplink/downlink data and capable of transmitting and receiving PHY/MAC control information of the terminal, and in case of a single-mode type such as the terminal 105, the carrier RF4 is preferably allocated in a FCC type since only one carrier RF4 is allocated.

From the standpoint of the terminals 103, 105, the types of carrier allocated from a base station can be divided into two kinds of groups, a primary carrier and a secondary carrier. Preferably, one primary carrier and a plurality of secondary carriers can be allocated to a terminal from a base station. According to the present invention, the primary carrier can transmit and receive data traffic and PHY/MAC control information between the terminal and the base station, and functions as a carrier mainly used for a control function of the terminal such as network entry of the terminal. Furthermore, the secondary carrier can be allocated to a terminal based upon a resource allocation command of the base station, and is used as a carrier for mainly transmitting and receiving data traffic. However, the secondary carrier may be also used as a channel for transferring specific control information between the base station and the terminal to perform a multi-carrier operation.

Referring to FIG. 1, among the carriers allocated to the terminal 103, RF1 or RF2 may become a primary carrier, and RF3 becomes a secondary carrier. Similarly, RF4 allocated to the terminal 105 functions as a primary carrier. As illustrated in FIG. 1, in a multi-carrier system, it is possible at the same time to support the terminal 103 supporting a multi-carrier approach and the terminal 105 supporting a single-carrier approach only, and the terminal 103 supporting a multi-carrier approach can be also used as a single-mode using a single-carrier approach based upon data traffic. However, even if it is used as a multi-mode or single-mode, at least one carrier should be allocated, and at this time, the relevant carrier functions as a primary carrier when only one carrier is allocated.

The primary carrier of a terminal is a FCC-type defined by a base station, and the carrier that has performed an initial network entry procedure will be determined as a primary carrier. The secondary carrier can be set to a FCC- or PCC-type, and allocated additionally based upon a request or instruction of the terminal or base station. Preferably, the terminal can transmit and receive all control information and secondary carrier information through a primary carrier, and mainly receive downlink data through a secondary carrier. Furthermore, a FCC-type secondary carrier established for a terminal may be established as a primary carrier for another terminal.

II. State Transition of Terminal According to Multi-Carrier Operating State

Figure 2:
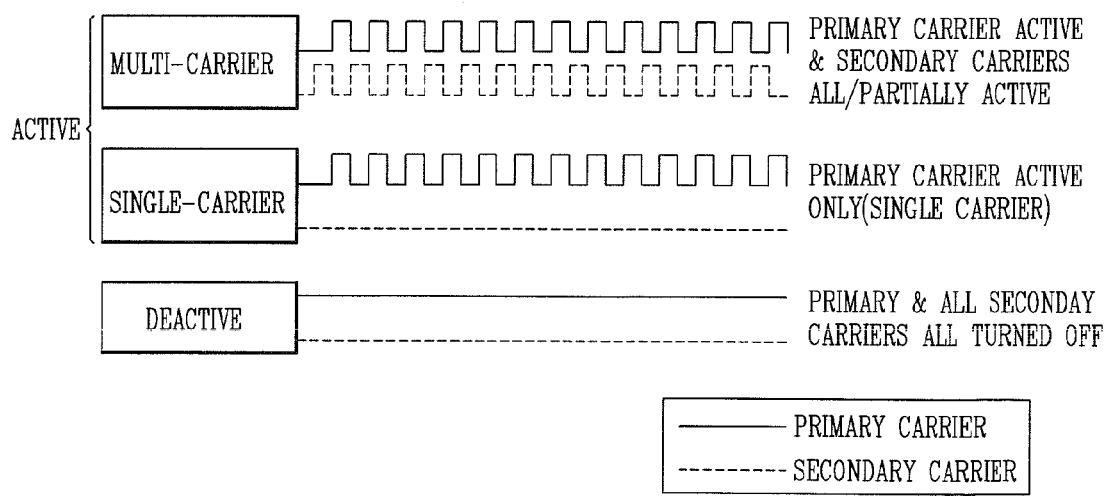
FIG. 2 is a view illustrating the management mode of a terminal supporting a multi-carrier according to the operating state of a primary carrier and a secondary carrier.

FIG. 2 is a view illustrating the management mode of a terminal supporting a multi-carrier according to the operating state of a primary carrier and a secondary carrier. In the terminal, as illustrated in FIG. 2, the management mode types may be divided into an active (multi-carrier, single-carrier) mode and a deactive mode according to the operating state of a primary carrier and a secondary carrier.

One primary carrier and one or a plurality of secondary carriers are in an active state when the terminal is managed in an activated multi-carrier mode, and all secondary carriers are in a deactive state when managed in an activated single-carrier mode. When the terminal is managed in a deactive state, all carriers of the terminal are deactivated and the relevant RFs are turned off.

The terminal supporting a multi-carrier may support three states, such a multi-carrier mode in which two or more carriers are activated, a single-carrier mode in which only one carrier is activated, and a deactive mode in which all carriers are deactivated as described above, and the terminal supporting only a single-carrier may support only an activated single-carrier and an idle mode. The terminal is operated in a multi-carrier or single-carrier mode according to the state of transmitting and/or receiving data to and/or from a base station, and for this purpose, multi-carrier commands are supported as illustrated in the following Table 1.

TABLE 1

| Multi-carrier command | Function |
|---|---|
| Activate Carrier | Activate one or a plurality of deactivated carriers |
| Deactivate Carrier | Deactivate one or a plurality of activated carriers |

When the terminal is operated in a single-carrier mode at the time of initially entering a network, and thereafter, additional carriers are required, additional single-carriers are secured through "Activate Carrier" in the multi-carrier command as illustrated in Table 1. On the contrary, when the data transmission and reception of a specific carrier is finished or the connection to the network is terminated, the carrier is deactivated through a "Deactivate Carrier" command. An overall state transition for the mode transition of the terminal according to such data traffic is illustrated in FIG. 3.

Figure 3:
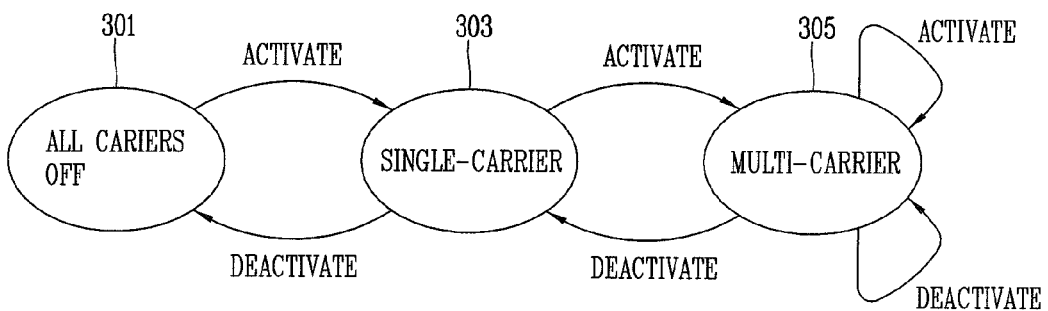
FIG. 3 is a state transition diagram illustrating the mode transition of a terminal according to data traffic.

Referring to FIG. 3, when a currently activated carrier in the terminal is deactivated, the relevant carrier will be in a deactivated state. If all single-carriers are deactivated in such a manner, then the terminal will be operated only with a primary carrier at the end. When data is transmitted and received only with a primary carrier in this manner, the terminal will be operated in a single-carrier mode 303.

The activation of deactivation of a carrier allocated to the terminal according to the generation of data traffic will be described with reference to FIG. 1. In case of the first terminal 103 illustrated in FIG. 1, active carriers in which traffic is actually generated among the carriers RF1, RF2, and RF3 allocated by the base station may be one carrier RF1, or two carriers RF1 and RF2. On the contrary, if the carrier RF3 is included in three carriers allocated to the terminal 103 from the base station 101, but classified as an activated carrier even when there does not exist downlink data traffic from the base station, it is preferable to perform a deactivation process for the carrier in which traffic is not generated because the relevant RF of the terminal continues to be turned on and thus unnecessary power consumption may be generated. The activation and deactivation of a carrier will be described in more detail in the related section thereof.

The function of activating or deactivating a carrier may be configured based on data traffic as described above, but according to circumstances, may be configured based on the QoS (quality of service) requirements of the terminal, or may be configured based on the management object of the base station. For the QoS requirements of the terminal, according to an embodiment of the present disclosure, the capability for various services currently existing in the terminal may include a maximum sustained traffic rate, a maximum traffic burst size, or the like. Accordingly, the base station checks the service capability of the terminal and then allocates the number of carriers suitable to that. The method of activating and deactivating a carrier according to the service capability of the terminal is similar to the activation and deactivation of a carrier based on traffic as described above, and therefore, the detailed description thereof will be omitted.

Hereinafter, the operation of activating and deactivating a carrier based on data traffic will be described in more detail with respect to the related drawings.

III. Method of Indicating Carrier Activation and Deactivation According to Whether there Exists Data Traffic in a Multi-Carrier System FIG. 4 is a flow chart illustrating the process of activating and deactivating a multi-carrier on the basis of data traffic according to an embodiment of the present invention.

The terminal performs an initial network entry procedure (S401), and carrier F1 is used as a primary carrier of the terminal when the used carrier at this time is referred to as F1 as described above. As illustrated in FIG. 4, when the terminal is allocated with F1 and F2 as usable multi-carriers, carrier F1 used in the initial network entry procedure may be defined a FCC (fully configured carrier) type primary carrier, and carrier F2 may be defined as a PCC-type secondary carrier. The base station activates or deactivates the relevant carrier if data traffic to be transmitted to a specific secondary carrier F2 is generated or data traffic being transmitted is finished, and for this purpose, transmits an indication message (Traffic IND) for the activation and deactivation of a carrier to the terminal.

Figure 4:
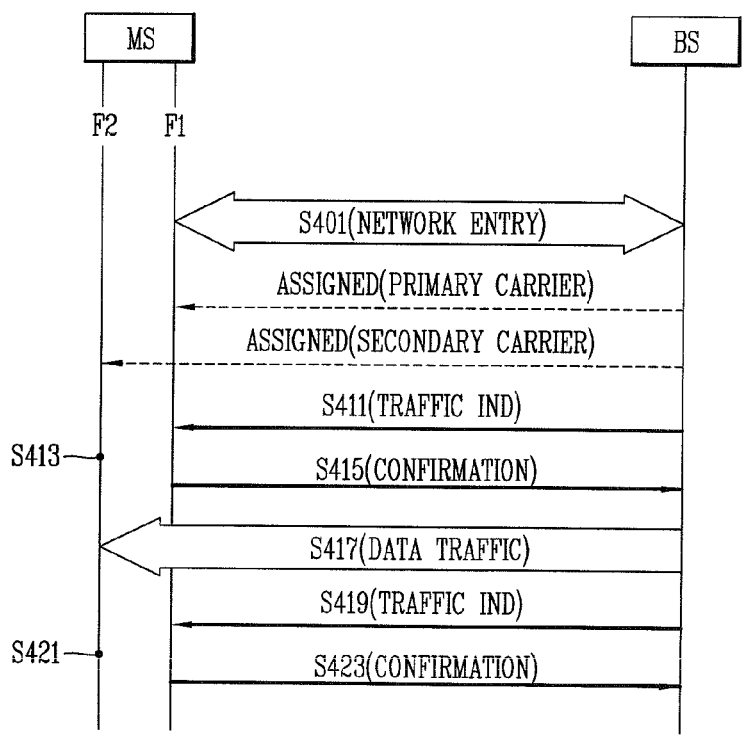
FIG. 4 is a flow chart illustrating the process of activating and deactivating a multi-carrier on the basis of data traffic according to an embodiment of the present invention.

As illustrated in FIG. 4, if data traffic to be transmitted to the secondary carrier F2 is generated in a state that the primary carrier F1 of the terminal is only activated, then the base station transmits an indication message (Traffic IND) for the traffic generation of the secondary carrier F2 to the terminal through the primary carrier F1 (S411). The traffic generation indication message (Traffic IND) may include information on a traffic generation timing, and additionally, may include index information of an activation object carrier, a command for the activation or deactivation of an object carrier, offset information related a time for executing the relevant operation, and the like. The traffic generation indication message (Traffic IND) may be transferred in any one of Extended Subheader, Signaling Header, Tailor, Piggy back, MAP information, and MAC management messages. The more detailed description of the traffic generation indication message (Traffic IND) will be described later, and hereinafter, an overall operation will be described based on the type of MAC management messages.

The terminal receives a traffic generation indication message (Traffic IND) of a secondary carrier F2 from the base station through a currently activated primary carrier F1, and turns on the relevant RF to activate a currently deactivated single-carrier F2 (S413). In this manner, if the beginning of data traffic transmitted and received between the base station and the terminal is notified from the base station to the terminal, then the terminal can set up the RF of the relevant carrier according to a timing at which data traffic should be received or transmitted through the secondary carrier. According to another embodiment of the present disclosure, the terminal may select a carrier RF suitable to the current QoS service capability to activate, and it may be notified to the base station through the primary carrier.

Even when the terminal receives a traffic generation indication message, a delay time consumed for the processing of turning on the relevant RF module may be generated, and according to circumstances, the terminal may not normally receive a message transmitted from the base station or the relevant carrier may not be normally turned on even when received. In consideration of such circumstances, preferably, if the RF module corresponding to the secondary carrier F2 of the terminal is normally turned on, then a confirmation message (Confirmation) to this is transmitted to the base station (S415). The turn-on confirmation message of the secondary carrier F2 may be transferred through the primary carrier F1 of the terminal, and according to another embodiment of the present disclosure, it may be also directly transferred to the base station through an activated secondary carrier F2. If an activate confirmation message of the secondary carrier F2 is received from the terminal, then the base station transmits the generated data traffic to the terminal through the secondary carrier F2 (S417).

When there is no data traffic anymore generated after performing data transmission and reception between the terminal and the base station through the secondary carrier F2, the base station transmits a traffic termination indication message (Traffic Indicator) (S419) to prevent unnecessary power consumption.

The terminal turns off the RF of the relevant carrier upon receiving a traffic termination indication message (Traffic Indicator) from the base station (S421), and transfers a confirmation message to this to the base station (S423).

Figure 5:
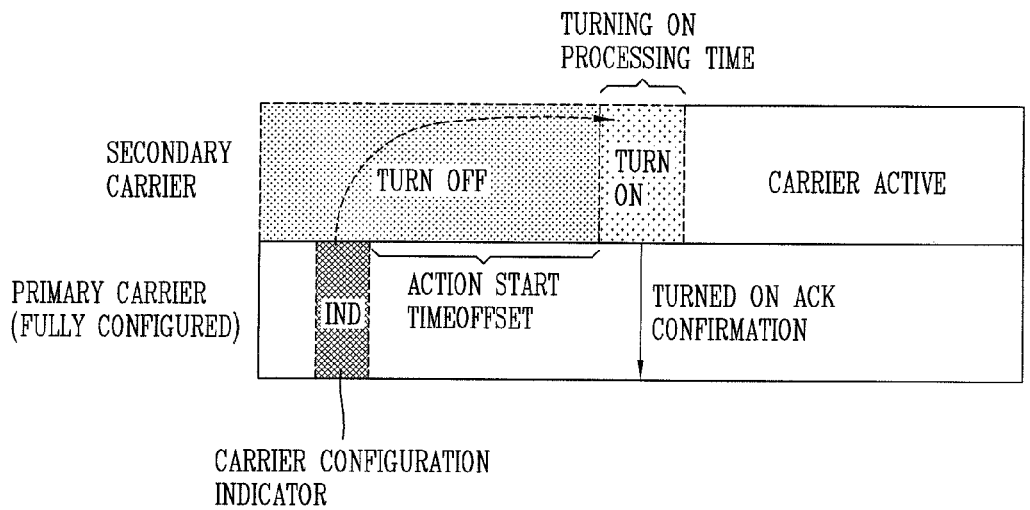
FIG. 5 is a view illustrating that a secondary carrier is activated according to an embodiment of the present invention.

FIG. 5 is a view illustrating that a secondary carrier is activated according to a traffic indication message (Traffic Indicator) received through a primary carrier.

The terminal receives the activation information of a secondary carrier (carrier configuration indicator) through a primary carrier, and turns on the relevant RF according to the expected data traffic generation timing of a currently deactivated secondary carrier and activates the secondary carrier. When the activated secondary carrier is a FCC (fully configured carrier), resource allocation for persistent traffic generated subsequent to being activated may be directly allocated to the secondary carrier through DL/UP MAP information or the like or allocated through a primary carrier. An ACK message may be transferred to confirm if the activation of the relevant carrier is normally carried out, and the setting for activating the secondary carrier again may be repeated if the ACK message is not normally transmitted. When traffic is notified through the MAP of a downlink-scheduling channel (DL Scheduling Channel) of a primary carrier, traffic scheduling for the next frame is notified. The activation indication information of a secondary carrier may include relative offset information, and through this, it may be possible to check a more accurate timing for activating the relevant carrier. At this time, the offset value may be a fixed or previously set value, and preferably, it may be adaptively configured according to the circumstance. The unit of a relative offset value may be a subframe or frame unit.

Figure 6:
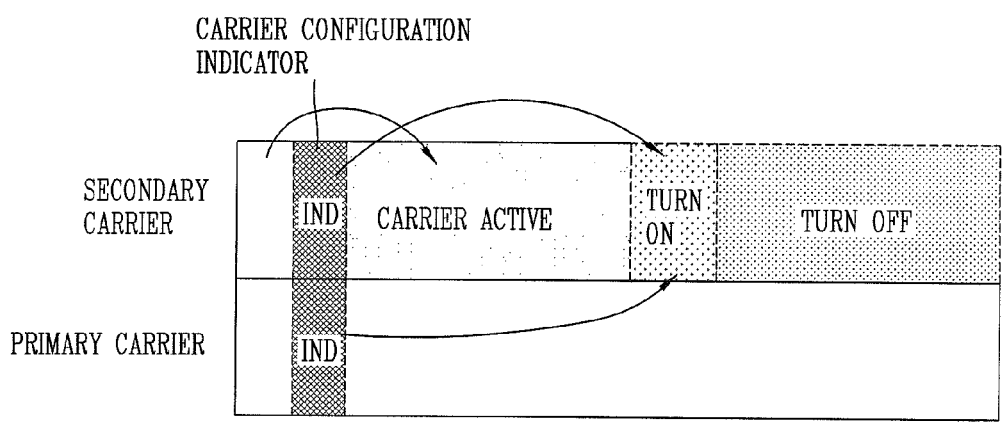
FIG. 6 is a view illustrating that the relevant indication message is received when data traffic is terminated according to an embodiment of the present invention.

FIG. 6 is a view illustrating that an indication message indicating a timing of deactivating the relevant carrier is received through a primary or secondary carrier when data traffic is terminated. If an indication message (Carrier configuration Indicator) for the deactivation of a secondary carrier is received from the base station through a primary carrier or secondary carrier, then the terminal deactivates the secondary carrier and turns off the RF after current traffic is terminated. When the deactivation of a secondary carrier is normally carried out, ACK for confirming this is transmitted to the base station through a secondary or primary carrier, and subsequently the terminal turns off the relevant secondary carrier until receiving a command for activating the relevant secondary carrier again, thereby preventing unnecessary power consumption.

Figure 7:
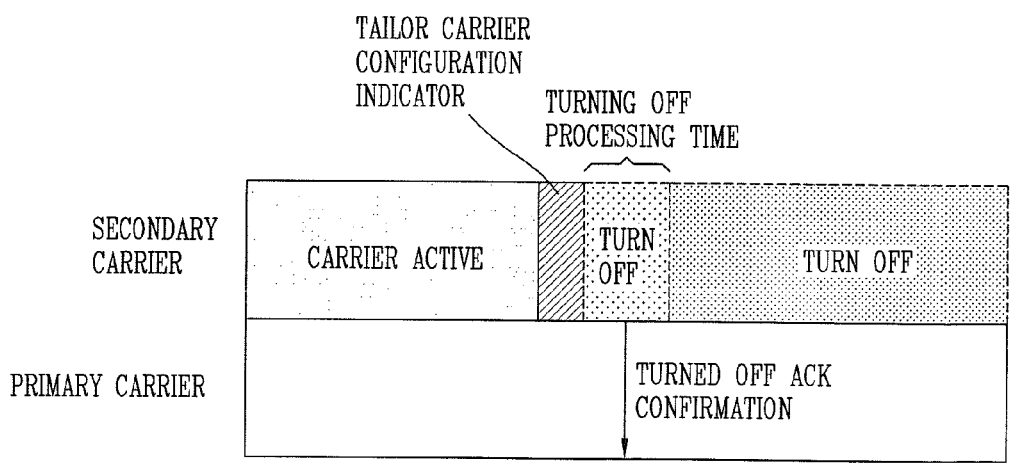
FIG. 7 is a view illustrating that an indication message is received though the tailor information of data traffic according to an embodiment of the present invention.

FIG. 7 is a view illustrating an embodiment in which an indication message (Carrier configuration Indicator) for the deactivation of a secondary carrier is received though the tailor information of data traffic.

In case of FIG. 6, an indication message (Carrier configuration Indicator) for the deactivation of a secondary carrier is received through a MAC message, but the deactivation timing of a current carrier is notified by adding tailor information similar to a header to the end of data received through a secondary carrier as illustrated in FIG. 7. Accordingly, it has an advantage that the terminal may perform carrier deactivation at a relatively accurate time and turn off the relevant RF without receiving an additional Indicator message.

Hereinafter, a traffic indication message (Traffic IND) will be described in detail.

IV. Embodiment of Traffic Indicator

An indication message indicating the activation and deactivation of a multi-carrier may be configured in any one form of Extended Subheader, Signaling Header, Tailored traffic Indicator, Piggy back traffic Indicator, MAP information message, and MAC management message. Hereinafter, each indication message will be described in detail.

(1) Multi Carrier Extended Subheader Traffic Indicator

Table 2 illustrates an extended subheader type traffic indication message according to an embodiment of the present disclosure.

TABLE 2

| Syntax | Size(bit) | Notes |
|---|---|---|
| Extended HeaderHeader( ){ | | |
|   LAST | 4 | Last Extended Header indication:<br>0 = one or more extended header follows the current extended header unless specified otherwise:<br>1 = this extended header is the last extended header unless specified otherwise |
|   Type | TBD | Type of extended header |
|   Body Contents | Variable | Type dependent content |
| } | | |

According to this embodiment, while a terminal supporting a multi-carrier operates with a multi-carrier or single-carrier subsequent to terminating negotiation with a base station, the execution of additional functions such as requesting additional allocation of a secondary carrier, deactivating a currently activated secondary carrier, or the like is configured through Multi-Carrier control Extended Subheader. The Multi-Carrier control extended subheader functions as an Indicator message, and may include Carrier Index indicating an index of the relevant carrier, Operation indicating whether to activate or deactivate a carrier corresponding to the carrier index, Relative Offset information indicating a timing for implementing the Operation, and the like.

The kinds of extended subheaders currently being defined may include a fragmentation and packing extended header, a fragmentation extended header, a multiplexing extended header, and the like. The format of MCEH (Multi-carrier Extended Header), which is an extended subheader for multi-carrier operation, is illustrated in the following Table 3.

TABLE 3

| Syntax | Size(bit) | Notes |
|---|---|---|
| MCEH( ) { | — | — |
|   Carrier index | 8 | Index number of the carrier that is to be configured |

TABLE 3-continued

| Syntax | Size(bit) | Notes |
|---|---|---|
| Carrier Action | 1 | The indicator whether to activate or Deactivate the carrier.<br>0: Deactivate carrier<br>1: Activate carrier |
| Traffic indicatior | 7 | The time offset in number of frames or subframes indicating the time when to take action of the specified carrier. |
| Reserved | | |
| } | | |

(2) Signaling Header Type Traffic Indicator

According to another embodiment of the present disclosure, traffic indicator may be included in a signaling header to be transmitted in a signaling header format. Table 4 illustrates a signaling header format according to an embodiment of the present disclosure.

TABLE 4

| Type field (3 bits) | Signaling Header Type |
|---|---|
| 000 | BR with STID |
| 001 | BR without STID |
| 010 | BR with UL Tx Power Report |
| 011 | Feedback Header (IM) |
| 100 | Event Driven Indicator (EDI) Header with STID |
| 101 | Event Driven Indicator (EDI) Header without STID |
| 110 | Activation/deactivation indicator for Multi-carrier support |
| 111 | Reserved |

The field "110" of the signaling header type as illustrated in FIG. 4 relates to the activation and deactivation of a multi-carrier, and may include "Carrier Index" information indicating an index of the relevant carrier, "Operation" indicating information whether to activate or deactivate a carrier corresponding to the index, "Relative Offset (Start time)" information indicating a timing for implementing the "Operation", and the like.

Figure 8:
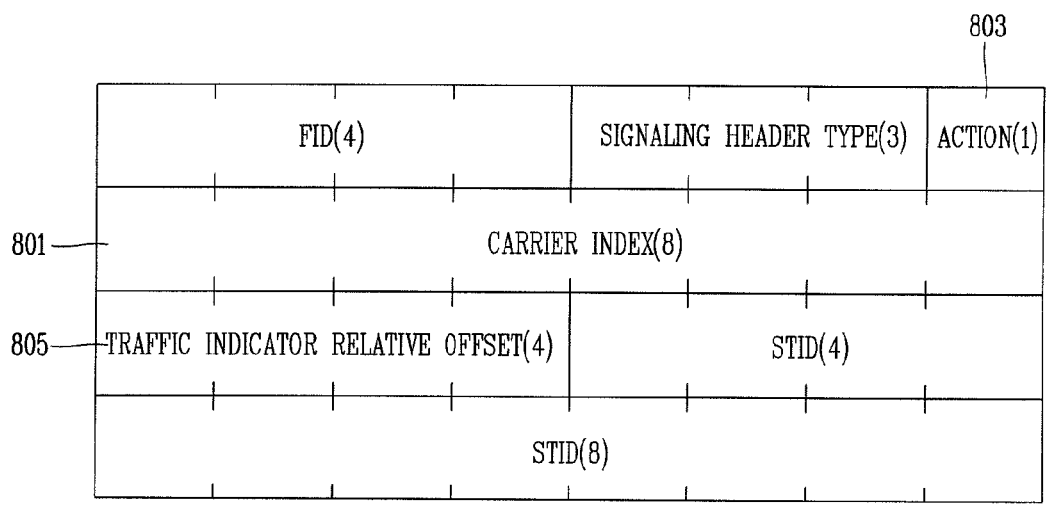
FIG. 8 is a view illustrating the structure of a traffic indicator included in a signaling header.

FIG. 8 is a view illustrating the structure of a traffic indicator included in a signaling header. In FIG. 8, Carrier Index 801 indicates an index for a carrier to be activated or deactivated, which may be configured with 8 bits. Action 803 is bit information for activating or deactivating the relevant carrier, which is configured with 1 bit. For example, if the Action bit value is "0", then it means that the relevant carrier is deactivated, and if the Action bit value is "1", then it means that the relevant carrier is activated, Traffic Indicator relative offset 805 indicates information for a timing of implementing the Action 803, which may be configured with 4 bits.

(3) Data Tailor Type Traffic Indicator

As previously illustrated in FIG. 7, a tailor header is added to an end portion of packet data similar to the form of a subheader to inform an end of the traffic of a current packet. In case of this embodiment, an end timing of the traffic may be seen without an additional indicator, thereby enhancing efficiency in the aspect of resource use at the time of transmitting data. The Tailor Traffic Indicator may include "Carrier Index" information indicating an activation and deactivation object carrier index, "Operation" indicating information whether to activate or deactivate a carrier corresponding to the index, "Relative Offset (Start time)" information indicating a timing for implementing the "Operation", and the like.

(4) Piggy Back Type Traffic Indicator

According to another embodiment of the present invention, information for existence or non-existence of traffic and state transition of a carrier may be notified through a piggy back field without an additional indication message. The piggy backed traffic indicator may include "Carrier Index" information indicating an activation and deactivation object carrier index, "Operation" indicating information whether to activate or deactivate a carrier corresponding to the index, "Relative Offset (Start time)" information indicating a timing for implementing the "Operation", and the like.

(5) Traffic Indicator Through MAP Information

According to another embodiment of the present invention, the information of a traffic indicator may be notified through MAP. Resources for an indicator is allocated to MAP, and the terminal recognizes the indication of traffic with reference to the indicator information location of MAP. The traffic indicator MAP may include "Carrier Index" information indicating an activation and deactivation object carrier index, "Operation" indicating information whether to activate or deactivate a carrier corresponding to the index, "Relative Offset (Start time)" information indicating a timing for implementing the "Operation", and the like.

(6) Traffic Indicator Through MAC Management Message

According to another embodiment of the present invention, Traffic Indicator is transmitted through a MAC management message defined by IEEE 802.16e. The base station may inform the terminal of a start timing traffic and an end timing of traffic through a multi-carrier request MAC management message. The MAC management message may include "Carrier Index" information indicating an activation and deactivation object carrier index, "Operation" indicating information whether to activate or deactivate a carrier corresponding to the index, "Relative Offset (Start time)" information indicating a timing for implementing the "Operation", and the like. Table 5 illustrates an embodiment of the MAC management message.

TABLE 5

| Syntax | Size (bit) | Notes |
|---|---|---|
| MC_Management_Message_format_( ) { | — | |
| Management Message Type = x | 8 | |
| Carrier Management type | 2 | 0b00: secondary carrier management<br>0b01: primary carrier change<br>0b10: carrier switching<br>0b11: reserved |
| If (message type == 00){ | | |
| Number of carrier | [3] | The number of activated or deactivated carrier(s) |
| Segment type (or Combined Feedback indication) | 1 | 0b0: MAC segmented carrier (or separated Feedback)<br>0b1: PHY segmented carrier (or combined Feedback) |
| for (i=0; i++; i< Number of carrier) | | |
| { | | |

TABLE 5-continued

| Syntax | Size (bit) | Notes |
|---|---|---|
| If (Segment type ==1){<br>Carrier index}<br>If (Segment type== 0){Feedback Channel Allocation IE( )} | [3] | Carrier Index of activated or deactivated carrier(s) |
| Carrier Action Indicator (Indicator type) | 1 | 0: Carrier activation<br>1: Carrier deactivation (Deactivate) |
| Start Time | 8 | The time offset to trigger the Carrier Action (activate/Deactivate) in subframe or frame unit |
| }<br>}<br>If (message type == 01 or 10) {<br>...<br>If (message type == 10) {<br>...}<br>}<br>Padding | variable | Padding bits to ensure byte aligned. Shall be set to zero |
| TLV encoded information<br>} | variable | TLV-specific |

Referring to FIG. 5, when the carrier management type has a value of "0b00", it indicates a secondary carrier management operation and the detailed description thereof is similar to the foregoing description.

V. Structure and Function of Terminal Supporting a Multi-Carrier

Figure 9:
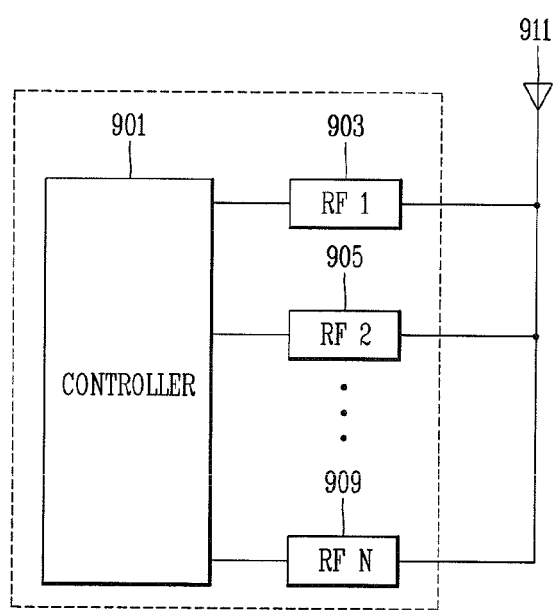
FIG. 9 is a view schematically illustrating the configuration of a terminal supporting a multi-carrier according to an embodiment of the present invention.

FIG. 9 is a view schematically illustrating the configuration of a terminal supporting a multi-carrier according to an embodiment of the present invention. A terminal supporting a multi-carrier according to the present disclosure may include at least one or more RF receiving units 903, 905, 909 and an antenna 911. Hereinafter, the description for the configuration of a typical terminal will be omitted, and only the configuration and function associated with data transmission and reception using a multi-carrier according to the present disclosure will be described. In the terminal supporting a multi-carrier as illustrated in FIG. 9, the RF receiving units 903, 905, 909 as many as the number of supportable multi-carriers are independently configured, and each RF receiving unit transmits and/or receives data to and/or from the base station through the relevant carrier. Referring to FIG. 9, the RF receiving unit is configured with a first RF receiving unit 903 for transmitting and/or receiving data to and/or from through a first carrier, a second RF receiving unit 905 for transmitting and/or receiving data to and/or from through a second carrier, and with an N-th RF receiving unit 903 for transmitting and/or receiving data to and/or from through an N-th carrier, and the controller 901 controls the power of the first RF receiving unit 903, second RF receiving unit 905, N-th RF receiving unit 909 according to whether data traffic is generated at each receiving unit to prevent unnecessary power consumption from being generated. Preferably, the controller 901 receives an indication message (Traffic Indication) indicating the generation and termination of data traffic received through the second RF receiving unit 905 from the base station through the first RF receiving unit 903, and controls the power of the second RF receiving unit 905 according to the indication message received from the base station to perform the activation and deactivation operation of a second carrier.

As described above, the first carrier is a primary carrier of the terminal, and the second carrier performs the role of a secondary carrier of the terminal.

The indication message may include Carrier Index information indicating an activation and deactivation object carrier index, Operation indicating information whether to activate or deactivate a carrier corresponding to the carrier index, Relative Offset information indicating a timing for implementing the operation, and the like.

Furthermore, an indication message indicating the activation and deactivation of a multi-carrier may include Extended Subheader, Signaling Header, Tailored traffic Indicator, Piggy back traffic Indicator, MAP information or MAC (Medium Access Control) management message, and the like.

The activation or deactivation of a secondary carrier may be determined by the QoS (Quality of Service) requirements such as a data traffic status, a maximum sustained traffic rate, a maximum traffic burst size, or the like or may be determined by load condition of carriers or other factors.

According to another embodiment of the present invention, the controller 901 may receive an indication message indicating the activation or deactivation of a secondary carrier from the base station to control the power of the second RF receiving unit 905, thereby performing the activation or deactivation of a secondary carrier, and may transmit a confirmation message to this to the base station through a primary carrier.

The method according to the present invention as described above may be implemented by software, hardware, or a combination of both. For example, the method according to the present invention may be stored in a storage medium (for example, an internal memory of the terminal, flash memory, hard disk, and so on), and may be implemented by codes or instructions within a software program that can be performed by a processor (for example, a microprocessor within the terminal).

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

What is claimed:

1. A method of operating carriers at a user equipment in a wireless communication system, the method comprising:
configuring a primary carrier and a plurality of secondary carriers, wherein the primary carrier is configured as a carrier for performing a network entry procedure;
receiving a message through the primary carrier, the message including:
an indicator indicating activation of a secondary carrier of the plurality of secondary carriers; and an index of the secondary carrier to be activated;
receiving a secondary carrier deactivation time offset, the secondary carrier time offset being a number of frames;
activating the secondary carrier no earlier than a specific subframe offset, the specific subframe offset being a number of subframes after receiving the indicator;
receiving data on the activated secondary carrier; and
deactivating the activated secondary carrier based on the the secondary carrier deactivation time offset.

2. The method of claim 1, wherein the message is received as a type of a Medium Access Control (MAC) message.

3. The method of claim 1, wherein the primary carrier is always activated and the secondary carrier is initially deactivated.

4. The method of claim 1, wherein the secondary carrier is activated based on a quality of service (QoS) capability.

5. A user equipment of operating carriers in a wireless communication system, the user equipment comprising:
a wireless communication unit; and
a controller operatively connected to the wireless communication unit and configured to
configure a primary carrier and a plurality of secondary carriers, wherein the primary carrier is configured as a carrier for performing a network entry procedure;
receive a message through the primary carrier, the message including:
an indicator indicating activation of a secondary carrier of the plurality of secondary carriers; and
an index of the secondary carrier to be activated; and
receive a secondary carrier deactivation time offset, the secondary carrier deactivation time offset being a number of frames;
activate the secondary carrier no earlier than a specific subframe offset, the specific subframe offset being a number of subframes after receiving the indicator,
receive data on the activated secondary carrier; and
deactivate the activated secondary carrier based on the secondary carrier deactivation time offset.

6. The user equipment of claim 5, wherein the message is received as a type of a Medium Access Control (MAC) message.

7. The user equipment of claim 5, wherein the controller is further configured that activate always the primary carrier and initially deactivate the secondary carrier.

* * * * *